United States Patent

Ema

[11] Patent Number: 5,978,099
[45] Date of Patent: *Nov. 2, 1999

[54] FACSIMILE SYSTEM

[75] Inventor: Hiromichi Ema, Tokyo, Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/842,736

[22] Filed: Apr. 16, 1997

[30] Foreign Application Priority Data

Apr. 18, 1996 [JP] Japan .................................... 8-121008

[51] Int. Cl.⁶ ...................................................... H04N 1/32
[52] U.S. Cl. ............................................................ 358/442
[58] Field of Search ...................................... 358/442, 437,
358/434, 448, 453, 468, 400, 406, 407;
364/492, 707; 307/38, 39, 64; 395/750;
379/90, 102, 100, 110, 377, 379, 413, 373,
65, 66, 750

[56] References Cited

U.S. PATENT DOCUMENTS

| | | | |
|---|---|---|---|
| 5,003,578 | 3/1991 | Lin | 379/90 |
| 5,392,023 | 2/1995 | D'Avello et al. | 358/400 |
| 5,579,524 | 11/1996 | Kikinis | 395/750 |
| 5,588,054 | 12/1996 | Shin et al. | 379/413 |
| 5,694,289 | 12/1997 | Ema | 361/680 |

FOREIGN PATENT DOCUMENTS 6233003  8/1994  Japan ............................ H04M 11/00

*Primary Examiner*—Jose L. Couso
*Assistant Examiner*—Duy M. Dang
*Attorney, Agent, or Firm*—Cooper & Dunham LLP

[57] ABSTRACT

A facsimile apparatus and an information processing apparatus are connected with one another through connecting portions over wires or by radio in a facsimile system. The facsimile apparatus includes a power supply instructing portion which outputs a power supply instruction signal through the connecting portions, the power supply instruction signal instructing whether power supply is on in all the portions of the information processing apparatus or power supply is on only in certain portions of the information processing apparatus, the certain portions being used for receiving the power supply instruction signal from the facsimile apparatus and causing power supply to be on in all the portions of the information processing apparatus. The information processing apparatus includes a power supply controlling portion which causes power supply to be on in all the portions of the information processing apparatus or power supply to be on only in the certain portions of the information processing apparatus, according to the power supply instruction signal from the power supply instructing portion.

6 Claims, 2 Drawing Sheets

FACSIMILE SYSTEM

BACKGROUND OF THE INVENTION

1. Field of the Invention

The present invention relates to a facsimile system, and, in particular, to a facsimile system in which a facsimile apparatus and an information processing apparatus are connected so that data transfer between the two apparatuses can be performed.

2. Description of Related Art

Recently, a facsimile apparatus is not only used alone but also is connected with an information processing apparatus such as a personal computer or the like so that information is transferred between the two apparatus.

In a facsimile system in which a facsimile system is connected with such a separate information processing apparatus, for example, with a personal computer, data produced in the personal computer is transferred to the facsimile apparatus. The data is externally transmitted from the facsimile apparatus. Further, image data which has been received by the facsimile apparatus is transferred to the personal computer. The image data is printed out by a printer which is connected to the personal computer.

When image data received by a facsimile apparatus is transferred to an information processing apparatus such as a personal computer, and is printed out by a printer connected to the personal computer, power supply should always be on not only in all the portions of the facsimile apparatus but also in all the portions of the information processing apparatus. In order for such a facsimile apparatus to be able to receive image data at any time, power supply should always be on in all the portions of the facsimile apparatus. However, it may not be necessary that the power supply always be on in all the portions of such an information processing apparatus connected to such a facsimile apparatus. When power supply is always on in both all the portions of such a facsimile apparatus and all the portions of such an information processing apparatus connected to the facsimile apparatus, power consumption is large. It is required to reduce power consumption of such a facsimile system.

SUMMARY OF THE INVENTION

An object of the present invention is to provide a facsimile system in which a facsimile apparatus causes power supply to be on in all the portions of an information processing apparatus and power supply to be on only in certain portions of the information processing apparatus. The certain portions are portions which are used for receiving a power supply instruction signal from the facsimile apparatus and causing power supply to be on in all the portions of the information processing apparatus. Thereby, only when the facsimile apparatus needs the information processing apparatus, the facsimile apparatus automatically causes power supply to be on in all the portions of the information processing apparatus. Thereby, facsimile communication can be properly performed. Further, power consumption of the facsimile system can be reduced.

Another object of the present invention is to provide the facsimile system in which, when facsimile image data is received by the facsimile apparatus, the facsimile apparatus causes power supply to be on in all the portions of the information processing apparatus. Thereby, facsimile image data reception can be properly performed. Also, using the information processing apparatus, the received image data can be used in various information processing such as printing out of the image data. Thus, power consumption of the facsimile system is reduced and also the facsimile system can be conveniently used.

Another object of the present invention is to provide the facsimile system in which, when facsimile image data reception is finished, the facsimile apparatus causes power to be off in the information processing apparatus except certain portions of the information processing apparatus. As mentioned above, the certain portions are portions which are used for receiving a power supply instruction signal from the facsimile apparatus and causing power supply to be on in all the portions of the information processing apparatus. Thus, power supply is on in all the portions of the information processing apparatus only when it is necessary. Thereby, power consumption can be reduced in the facsimile system and also the facsimile system can be conveniently used.

Another object of the present invention is to provide the facsimile system in which, when facsimile image data reception is performed, the facsimile apparatus transfers the received image data to the information processing apparatus and causes the image data to be stored in storing means of the information processing apparatus. Thereby, the storing means of the information processing apparatus is used as image data storing means of the facsimile apparatus. Thus, resources of the facsimile system are effectively used. Also, power consumption can be reduced as a result of the facsimile apparatus causing power supply to be on in all the portions of the information processing apparatus only when it is necessary.

In a facsimile system according to the present invention, a facsimile apparatus, which performs facsimile communication through a predetermined facsimile communication process, and an information processing apparatus, which performs predetermined information processing, are connected with one another through connecting means over wires or by radio. The facsimile apparatus includes power supply instructing means which outputs a power supply instruction signal through the connecting means. The power supply instruction signal instructs whether power supply is on in all the portions of the information processing apparatus or power supply is on only in certain portions of the information processing apparatus. As mentioned above, the certain portions are portions which are used for receiving the power supply instruction signal from the facsimile apparatus and causing power supply to be on in all the portions of the information processing apparatus. The information processing apparatus includes power supply controlling means which causes power supply to be on in all the portions of the information processing apparatus or power supply to be on only in the certain portions of the information processing apparatus, according to the power supply instruction signal from the power supply instructing means. Thereby, only when the facsimile apparatus needs the information processing apparatus, the facsimile apparatus automatically causes power supply to be on in all the portions of the information processing apparatus. Thereby, facsimile communication can be properly performed. Further, power consumption of the facsimile system can be reduced.

It may be that, for example, when facsimile image data reception is performed, the power supply instructing means outputs, through the connecting means, the power supply instruction signal which instructs that power supply should be on in all the portions of the information processing apparatus. Thereby, facsimile image data reception can be performed properly. Also, using the information processing apparatus, the received image data can be used in various information processing such as printing out of the image data. Thus, power consumption of the facsimile system is reduced and also the facsimile system can be conveniently used.

Further, it may be that, for example, after the facsimile image data reception is finished, the power supply instructing means outputs, through the connecting means, the power supply instruction signal which instructs that power supply should be off in the information processing apparatus except certain portions of the information processing apparatus. As mentioned above, the certain portions are portions which are used for receiving the power supply instruction signal from the facsimile apparatus and causing power supply to be on in all the portions of the information processing apparatus.

Thereby, after facsimile image data reception is finished, the facsimile apparatus causes power supply to be off in the information processing apparatus except the certain portions of the information processing apparatus. Thus, power supply is on in all the portions of the information processing apparatus only when it is necessary. Thereby, power consumption can be reduced in the facsimile system and also the facsimile system can be conveniently used.

Further, it may be that, for example, the facsimile apparatus includes transferring means for transferring image data, which has been received in facsimile image data reception, to the information processing apparatus through the connecting means. Also, it may be that the information processing apparatus includes storing means and storage controlling means which causes the transferred image data to be stored in the storing means.

Thereby, when facsimile image data reception is performed, the facsimile apparatus transfers the received image data to the information processing apparatus and causes the image data to be stored in the storing means of the information processing apparatus. Thereby, the storing means of the information processing apparatus is used as image data storing means of the facsimile apparatus. Thus, resources of the facsimile system are effectively used. Also, power consumption can be reduced as a result of the facsimile apparatus appropriately causing power supply to be on and off in all the portions of the information processing apparatus except the certain portions.

Other objects and further features of the present invention will become more apparent from the following detailed description when read in conjunction with the accompanying drawings.

DETAILED DESCRIPTION OF PREFERRED EMBODIMENT

With reference to the figures, a preferred embodiment of the present invention will now be described. For the embodiment, various technical limitations will be described. However, the scope of the present invention is not limited to such limitations.

Figure 1:
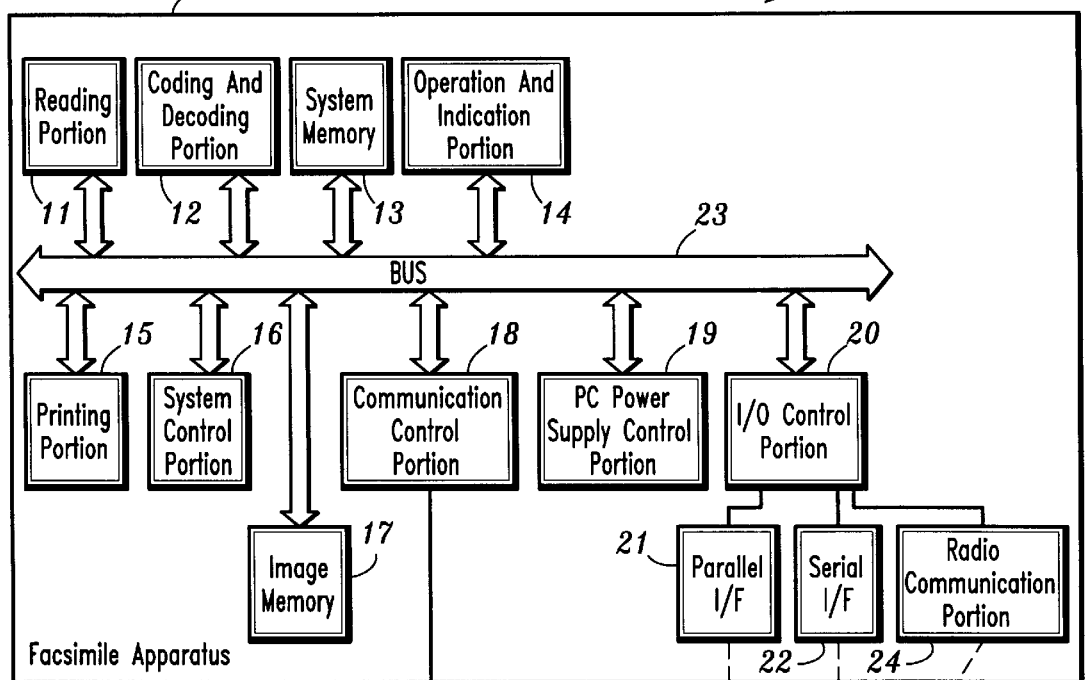
FIG. 1 shows a circuit block diagram of a facsimile system in one embodiment of a facsimile system according to the present invention.
Figure 1:
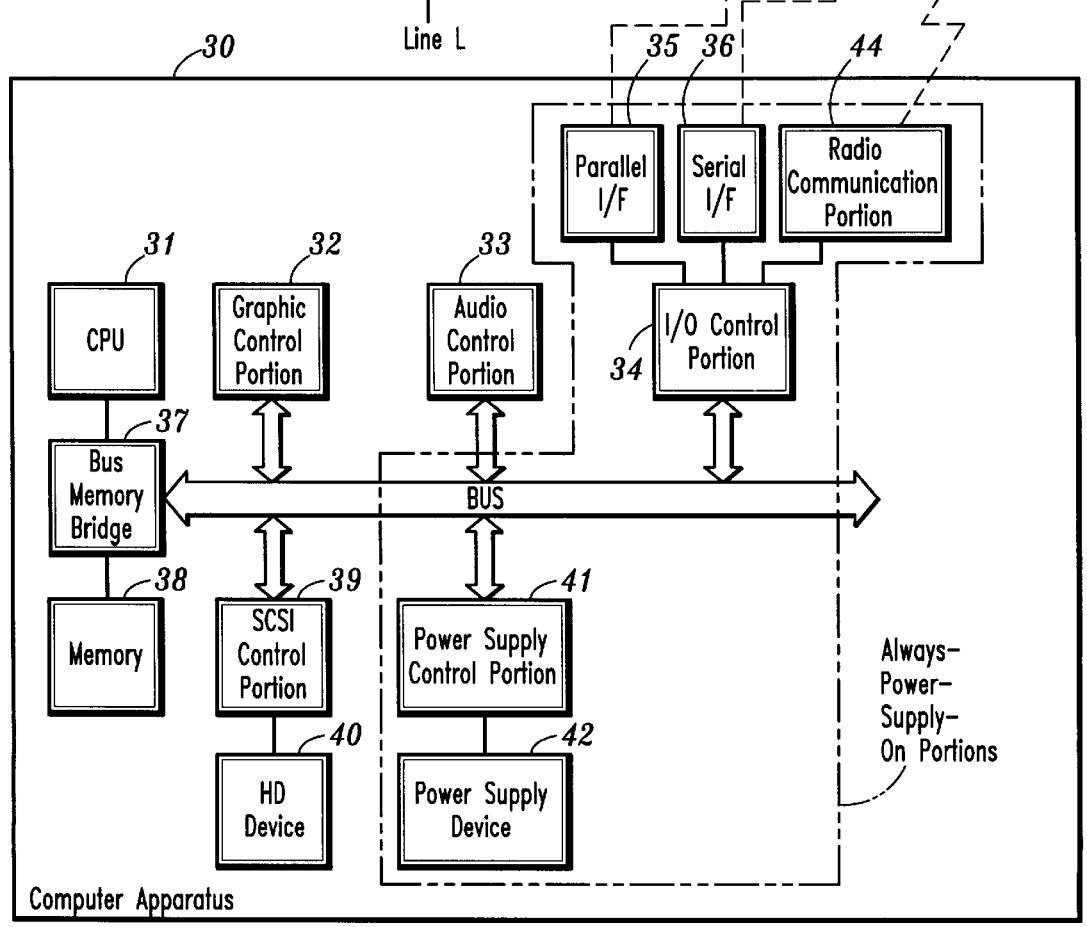

FIG. 1 shows a facsimile system 1 in the embodiment of the present invention.

As shown in the figure, the facsimile system includes a facsimile apparatus 10 and a computer apparatus 30.

The facsimile apparatus 10 includes a reading portion 11, a coding and decoding portion 12, a system memory 13, an operation and indication portion 14, a printing portion 15, a system control portion 16, an image memory 17, a communication control portion 18, a PC power supply control portion 19, an I/O control portion 20, a parallel I/F 21, a serial interface 22 and a radio communication portion 24. The respective portions are connected via a bus 23 with each other.

The reading portion includes, for example, an image scanner using a CCD (Charge Coupled Device). The reading portion scans an original and reads the image of the original with a predetermined resolution.

The coding and decoding portion 12 codes the image data according to a predetermined coding method and decodes the coded image data. By coding the image data, the image memory 17 or the like can be efficiently used for storing the image data, and also, a time required for transmitting the image data can be reduced.

The system memory 13 includes ROM (Read Only Memory) or the like. In the system memory 13, programs for basic operations of the facsimile apparatus 10, a remote control operation program, which will be described later, and so forth are stored. In the system memory 13, various data needed for performing facsimile communication is also stored.

The operation and indication portion 14 includes various operation keys such as a numeric keypad, a start key, etc. The operation and indication portion 14 also includes a display (for example, a liquid crystal display) and so forth. Using the operation keys, an operator inputs various commands such as a data transmission command. On the display, the contents of commands which have been input with the operation keys and various information which the facsimile apparatus 10 serves notice to the operator are indicated.

The printing portion 15 includes a thermal printing device, an electrophotographic printing device or the like. The printing portion 15 prints out a received image or an image read through the reading portion 11 onto a recording paper sheet.

The system control portion 16 includes a CPU (Central Control Unit), RAM (Random Access Memory) and so forth. The system control portion 16, based on programs stored in the system memory 13, controls the respective portions of the facsimile apparatus 10. The system control portion 16 executes a basic facsimile sequence of the facsimile apparatus. The system control portion 16 also executes the remote control operation which will be described later.

In the image memory 17, the image data of an original, which has been read through the reading portion 11 and coded through the coding and decoding portion 12, is stored. Also, in the image memory 17, image data, which has been received and coded, is stored.

The communication control portion 18 includes a modem, a network control portion and so forth. A line L, for example, of a PSTN (Public Switched Telephone Network) is connected to the communication control portion 18. The communication control portion 18 exchanges facsimile control signals with another facsimile apparatus, and performs a facsimile communication process. Further, the communication control portion 18 performs automatic calling and called operations through the network control portion, and performs modulation of a transmitting signal and demodulation of a received signal through the modem.

The power supply control portion 19 communicates with the computer apparatus through the bus 23, I/O control portion 20, and one of the parallel I/F 21, serial I/F 22 and radio communication portion 24, over wires or by radio. The PC power supply control portion 19 operates under control by the system control portion 16, and outputs a power supply instruction signal, which instruct that power supply should be on in all the portions of the computer apparatus 30 or power supply should be on only in certain portions of the computer apparatus 30, to the computer apparatus 30. The certain portions are portions which are used for receiving a power supply instruction signal from the facsimile apparatus 10 and causing power supply to be on in all the portions of the computer apparatus 30. When the PC power supply control portion 19 receives a power supply state signal from the computer apparatus 30, the PC power supply control portion 19 outputs the signal to the system control portion 16. The power supply state signal is a signal indicating that power supply is on in all the portions of the computer apparatus.

The parallel I/F 21, serial IF 22 and radio communication portion 24 are connected to the I/O control portion 20. Using at least one of these portions, data or signal communication is performed with an external apparatus such as the computer apparatus. In this embodiment, the facsimile apparatus 10 is connected with the computer apparatus 30 over wires such as RS-232C cable, RS-422 cable, bidirectional parallel cable or serial cable, or by radio such as infrared rays. For enabling communication between the facsimile apparatus 10 and the computer apparatus 30 using the parallel cable, the parallel cable is connected between the parallel I/F 21 of the facsimile apparatus 10 and a parallel I/F 35 of the computer apparatus. For enabling communication between the facsimile apparatus 10 and the computer apparatus 30 using the serial cable, the serial cable is connected between the serial I/F 22 of the facsimile apparatus 10 and a serial I/F 36 of the computer apparatus. For enabling communication between the facsimile apparatus 10 and the computer apparatus 30 by radio, the radio is performed through the radio communication portion 24 of the facsimile apparatus 10 and a radio communication portion 44 of the computer apparatus. In this embodiment, the facsimile apparatus 10 is connected through the parallel I/F 21 or the serial I/F 22 with the parallel I/F 35 or the serial I/F 36 of the computer apparatus, for transmitting and receiving image data between the facsimile apparatus 10 and the computer apparatus.

The computer apparatus 30 includes a CPU 31, a graphic control portion 32, an audio control portion 33, an I/O control portion 34, the parallel I/F 35, the serial I/F 36, the radio communication portion 44, a bus memory bridge 37, a memory 38, a SCSI control portion 39, a hard disk device (HD device) 40, a power supply control portion 41 and a power supply device 42. The respective portions are connected via a bus 43 with each other.

The CPU 31 performs operations based on programs stored in the memory 38 or the hard disk device 40. Thereby various operations such as document production, document revision and so forth are performed using the computer apparatus.

The graphic control portion 32 operates under control by the CPU 31 and performs graphical image processing. The audio control portion 33 operates under control by the CPU 31 and performs audio data processing.

The parallel I/F 35, serial I/F 36 and radio communication portion 44 are connected to the I/O control portion 34. Through the parallel I/F 35 or the serial I/F 36, the computer apparatus 30 is connected with an external apparatus such as the facsimile apparatus 10, a printer or the like. Thereby, the computer apparatus 30 transmits data or a signal to the external apparatus and receives data or a signal from the external apparatus. In this embodiment, the I/O control portion 34 of the computer apparatus 30 is connected with the parallel I/F 21 or the serial I/F 22 of the facsimile apparatus 10 through the parallel I/F 35 or the serial I/F 36, for transmitting and receiving image data between the two apparatuses.

The clock frequency of the memory 38 is different from the clock frequency of the CPU 31. Therefore, the memory 38 is connected to the CPU 31 through the bus memory bridge 37. As the memory 38, a RAM or the like is used. The memory 38 is used, for example, as a work memory of the CPU 31, and various data is stored in the memory 38.

The hard disk device 40 is connected to the SCSI (Small Computer System Interface) control portion 39. In the hard disk device 40, programs and various data, which has been produced using the computer apparatus 30, are stored. Image data transferred from the facsimile apparatus 10 is also stored in the hard disk device 40.

The power supply device 42 is connected to the power supply control portion 41. The power supply device 42 always supplies power to always-power-supply-on portions of the computer apparatus 30. As shown in FIG. 1, the always-power-supply-on portions include the power supply control portion 41, power supply device 42, I/O control portion 34, parallel I/F 35, serial I/F 36 and radio communication portion 44. The power supply control portion 41 controls the power supply device 42 so that the power supply device 42 supplies or does not supply power to all the portions of the computer apparatus 30 except the above-mentioned always-power-supply-on portions. The power supply device 42 includes a transformer, a constant power supply device and so forth. Thereby, the power supply device 42 transforms the voltage and current of the commercial power. Then, the power supply device 42 supplies the power to the respective portions of the computer apparatus 30. When the computer apparatus 30 receives the power supply instruction signal from the facsimile apparatus, according to the power supply instruction signal, the power supply control portion 41 controls the power supply device 42 so that the power supply device 42 supplies or does not supply power to all the portions of the computer apparatus 30 except the above-mentioned always-power-supply-on portions.

In the facsimile system 1, the facsimile apparatus 10 controls power supply of the computer apparatus 30 so that power supply is on or off in all the portions of the computer apparatus 30 except the above-mentioned always-power-supply-on portions. Further, a storage device of the computer apparatus 30 (for example, the hard disk device 40) is used as a storage device for image data of the facsimile apparatus 10.

Figure 2:
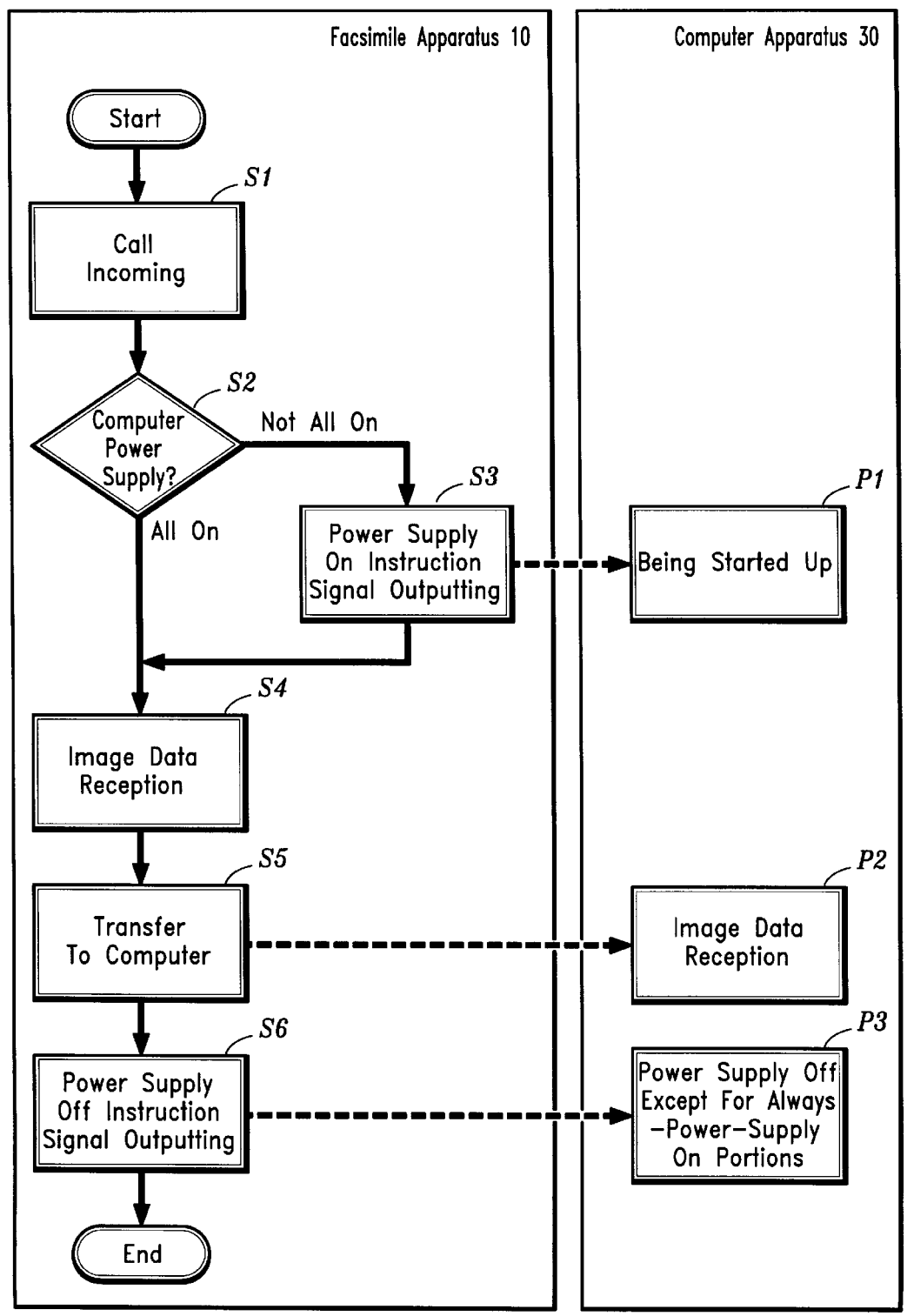
FIG. 2 shows a operation in the facsimile system shown in FIG. 1 when a facsimile apparatus performs facsimile image data reception.

In the facsimile system 1, the facsimile apparatus 10 and the computer apparatus 30 are connected with one another over wires (through the parallel I/F 21 and the parallel I/F 35 or the serial I/F 22 and the serial I/F 36). The facsimile apparatus 10 and the computer apparatus 30 may also be connected with one another by radio (through the radio communication portion 24 and the radio communication portion 44). With reference to FIG. 2, when call incoming occurs in the facsimile apparatus 10 (in step S1), the system control portion 16 determines, in step S2, whether or not power supply is on in all the portions of the computer apparatus 30. This determination is made by determining whether or not the power supply state signal is coming from the computer apparatus 30 to the PC power supply control portion 19 (through the bus 23, the I/O control portion 20, and the parallel I/F 21 and the parallel I/F 35, the serial I/F 22 and the serial I/F 36, or the radio communication portion 24 and the radio communication portion 44).

When it is determined in step S2 that the power supply state signal is not coming from the computer apparatus 30 to the PC power supply control portion 19 and thereby power supply is not on in all the portions of the computer apparatus 30 (that is, power supply is on only in the above-mentioned always-power-supply-on portions), the system control portion 16 instructs the PC power supply control portion 19 to output the power supply instruction signal which indicates that power supply should be on in all the portions of the computer apparatus 30. The PC power supply control portion 19 outputs the power supply instruction signal (power supply on instruction signal), which indicates that power supply should be on in all the portions of the computer apparatus 30, according to the instructions given by the system control portion 16 (in step S3).

This power supply instruction signal is transmitted to the power supply control portion 42 of the computer apparatus 30 (through the bus 23, I/O control portion 20, the parallel I/F 21 and the parallel I/F 35, the serial I/F 22 and the serial I/F 36, or the radio communication portion 24 and the radio communication portion 44, the I/O control portion 34 and the bus 43). When the power supply control portion 41 receives the power supply instruction signal, which indicates that power supply should be on in all the portions of the computer apparatus 30, the power supply control portion 41 controls the power supply device 42 so that power supply is on in all the portions of the computer apparatus 30. Thereby, the computer apparatus 30 is started up (in step P1).

The facsimile apparatus 10, when the PC power supply control portion 19 outputs (in step S3) the power supply instruction signal which indicates that power supply should be on in all the portions of the computer apparatus 30, or it is determined (in step S2) that the power supply state signal is coming from the computer apparatus 30 to the PC power supply control portion 19 and thereby power supply is on in all the portions of the computer apparatus 30, receives image data in step S4. Then, in step S5, the facsimile apparatus 10 transfers the received image data to the computer apparatus 30 via the I/O control portion 20, and the parallel I/F 21 or the serial I/F 22.

When the image data is transferred to the computer apparatus 30, the computer apparatus 30 receives the image data under control by the CPU 31, transfers the image data to the hard disk device 40 via the SCSI control portion 39, and causes the image data to be stored in the hard disk device 40 (in step P2).

The facsimile apparatus 10 transfers received data to the computer apparatus 30 successively. After the facsimile apparatus 10 transfers all of received image data to the computer apparatus 30, the system control portion 16 instructs the PC power supply control portion 19 to output the power supply instruction signal (power supply off instruction signal) which indicates that power supply should be off in all the portions of the computer apparatus 10 except the always-power-supply-on portions. The PC power supply control portion 19, based on the instructions given by the system control portion 16, outputs to the computer apparatus 30 the power supply instruction signal which indicates that power supply should be off in all the portions of the computer apparatus 10 except the always-power-supply-on portions (in step S6).

This power supply instruction signal is transmitted to the power supply control portion 42 of the computer apparatus 30 (through the bus 23, I/O control portion 20, the parallel I/F 21 and the parallel I/F 35, the serial I/F 22 and the serial I/F 36, or the radio communication portion 24 and the radio communication portion 44, the I/O control portion 34 and the bus 43). When the power supply control portion 41 receives the power supply instruction signal, which indicates that power supply should be off in all the portions of the computer apparatus 30 except the always-power-supply-on portions, the power supply control portion 41 controls the power supply device 42 so that power supply is off in all the portions of the computer apparatus 30 except the always-power-supply-on portions. However, at this time, the power supply control portion 41 waits for power-supply-off permission to be given by the CPU 31. After receiving the power-supply-off permission from the CPU 31, the power supply control portion 41 controls the power supply device 42 so that power supply is off in all the portions of the computer apparatus 30 except the always-power-supply-on portions. The CPU 31, as described above, successively transfers image data, which is transferred from the facsimile apparatus 10, to the hard disk device 40 and causes the image data to be stored in the hard disk device. After properly finishing the storage of the image data in the hard disk device, the CPU 31 gives the power-supply-off permission to the power supply control portion 41. After receiving the power supply instruction signal which indicates that power supply should be off in all the portions of the computer apparatus 30 except the always-power-supply-on portions, and receiving the power-supply-off permission from the CPU 31, the power supply control portion 41 controls the power supply device 42 so that power supply is off in all the portions of the computer apparatus 30 except the always-power-supply-on portions (in step P3). Thereby, image data transferred from the facsimile apparatus 10 can be properly and positively stored in the hard disk device 40.

Thus, in the embodiment of the present invention, the facsimile 10 apparatus causes power supply to be on in all the portions of the computer apparatus 30 (information processing apparatus) and power supply to be on only in the always-power-supply-on portions (certain portions) of the computer apparatus 30. The always-power-supply-on portions are portions which are used for receiving a power supply instruction signal from the facsimile apparatus and causing power supply to be on in all the portions of the information processing apparatus. Thereby, only when the facsimile apparatus 10 needs the computer apparatus 30, the facsimile apparatus 10 automatically causes power supply to be on in all the portions of the computer apparatus 30. Thereby, facsimile communication can be properly performed. Further, power consumption of the facsimile system can be reduced.

Further, when facsimile image data is received by a facsimile apparatus 10, the facsimile apparatus 10 causes power supply to be on in all the portions of the computer apparatus. Thereby, facsimile image data reception can be properly performed. Also, using the computer apparatus 30, the received image data can be used in various information processing such as printing out of the image data. Thus, power consumption of the facsimile system 1 is reduced and also the facsimile system 1 can be conveniently used.

Further, when facsimile image data reception is finished, the facsimile apparatus causes power to be off in the information processing apparatus except the always-power-supply-on portions of the computer apparatus 30. Thus, power supply is on in all the portions of the computer apparatus only when it is necessary. Thereby, power consumption can be reduced in the facsimile system 1 and also the facsimile system 1 can be conveniently used.

Further, when facsimile image data reception is performed, the facsimile apparatus 10 transfers the received image data to the computer apparatus 30 and causes the image data to be stored in the hard disk device 40 of the computer apparatus 30. After image data storage in the hard disk device 40 is finished, the facsimile apparatus 10 cause power supply to be off in all the portions of the computer apparatus 30 except the always-power-supply-on portions. Thereby, the hard disk device 40 of the computer apparatus 30 can be effectively used in substitution for the image memory 17 (image storing means) of the facsimile apparatus 10. Thus, resources of the facsimile system 1 can be effectively used. Also, power consumption can be reduced as a result of the facsimile apparatus causing power supply to be on in all the portions of the information processing apparatus only when it is necessary.

The present invention is not limited to the above-described embodiment, and variations and modifications may be made without departing from the scope of the present invention claimed in the claims.

For example, in the embodiment, transfer of image data is performed using the parallel cable or the serial cable. However, a method of transfer of image data is not limited to such a method using a cable. For example, transfer of image data may be performed by radio.

Further, in the embodiment, after receiving the power supply instruction signal which indicates that power supply should be off in all the portions of the computer apparatus 30 except the always-power-supply-on portions, and receiving the power-supply-off permission from the CPU 31, the power supply control portion 41 controls the power supply device 42 so that power supply is off in all the portions of the computer apparatus 30 except the always-power-supply-on portions. However, it is also possible that the facsimile apparatus 10 outputs the power supply instruction signal (which indicates that power supply should be off in all the portions of the computer apparatus 30 except the always-power-supply-on portions) after a time required for transferred image data to be stored in the computer apparatus 30. Thereby, it is not necessary that programs, according to which the CPU 31 operates, are appropriately configured so that the CPU 31 appropriately outputs the power-supply-off permission. Only by the operations of the power supply control portion 41, power supply is on and off in all the portions of the computer apparatus 30 except the always-power-supply-on portions.

What is claimed is:

1. A facsimile system comprising:
a facsimile apparatus that performs facsimile communication through a predetermined facsimile communication process;
an information processing apparatus that performs predetermined information processing; and
connecting means for connecting said facsimile apparatus and said information processing apparatus with one another via at least one of wires and radio,
said facsimile apparatus including power supply instructing means which outputs a power supply instruction signal through said connecting means, said power supply instruction signal instructing whether power supply is on in all the portions of said information processing apparatus or power supply is on only in certain portions of said information processing apparatus, said certain portions being used for receiving the power supply instruction signal from said facsimile apparatus and causing power supply to be on in said all the portions of said information processing apparatus, and
said information processing apparatus including a processing unit which controls said information processing apparatus, storage means and power supply controlling means which causes power supply to be on in said all the portions of said information processing apparatus or power supply to be on only in said certain portions of said information processing apparatus, according to the power supply instruction signal from said power supply instructing means, said power supply controlling means causing power supply to be on only in said certain portions of said information processing apparatus only after receiving permission from said processing unit indicating that data transmitted from said facsimile apparatus has been completely stored in said storage means.

2. The facsimile system according to claim 1, wherein, when facsimile image data reception is performed by said facsimile apparatus, said power supply instructing means outputs, through said connecting means, the power supply instruction signal which instructs that power supply should be on in said all the portions of said information processing apparatus.

3. The facsimile system according to claim 1, wherein, after facsimile image data reception of said facsimile apparatus is finished, said power supply instructing means outputs, through said connecting means, the power supply instruction signal which instructs that power supply should be off in said information processing apparatus except said certain portions.

4. The facsimile system according to claim 1, wherein:
said facsimile apparatus includes transferring means for transferring image data, which has been received in facsimile image data reception, to said information processing apparatus through said connecting means, and
said information processing apparatus includes storing means and storage controlling means which causes the transferred image data to be stored in said storing means.

5. A facsimile system comprising:
a facsimile apparatus that performs facsimile communication through a predetermined facsimile communication process;
an information processing apparatus that performs predetermined information processing; and
an electrical coupler electronically coupling the facsimile apparatus and the information processing apparatus with one another via at least one of wires and wireless communication,
the facsimile apparatus including a power supply control instruction unit having an output electronically coupled to the information processing apparatus via the electrical coupler and which outputs a power supply instruction signal to the information processing apparatus, the power supply instruction signal instructing whether power supply is on in all the portions of the information processing apparatus or power supply is on only in certain portions of the information processing apparatus, the certain portions being used for receiving the power supply instruction signal from the facsimile apparatus and causing power supply to be on in all the portions of the information processing apparatus, and the information processing apparatus including a processing unit which controls said information processing apparatus, a memory and a power supply controller having an input electronically coupled to the facsimile apparatus via the electrical coupler for controlling power supply in the information processing apparatus such that power supply is on in all the portions of the information processing apparatus or power supply is on only in certain portions of the information processing apparatus, according to the power supply instruction signal from the power supply control instruction unit, the power supply control instruction unit causing power supply to be on only in the certain portions of the information processing apparatus only after receiving permission from said processing unit indicating that data transmitted from said facsimile apparatus has been completely stored in said memory.

6. A method of controlling a facsimile system including a facsimile apparatus that performs facsimile communication through a predetermined facsimile communication process and an information processing apparatus that performs predetermined information processing, said method comprising:

outputting from the facsimile apparatus to the information processing apparatus a power supply instruction signal, the power supply instruction signal instructing whether power supply is on in all the portions of the information processing apparatus or power supply is on only in certain portions of the information processing apparatus, the certain portions being used for receiving the power supply instruction signal from the facsimile apparatus and causing power supply to be on in all the portions of the information processing apparatus; and controlling the information processing apparatus in response to the power supply instruction signal for causing power supply to be on in all the portions of the information processing apparatus or power supply to be on only in the certain portions of the information processing apparatus, according to the received power supply instruction signal, the power supply to the information processing apparatus being controlled to be on only in the certain portions of the information processing apparatus only after receiving permission from a processing unit indicating that data transmitted from said facsimile apparatus has been completely stored in a memory.

* * * * *